United States Patent [19]

Becher et al.

[11] Patent Number: 4,657,877

[45] Date of Patent: Apr. 14, 1987

[54] SILICON CARBIDE WHISKER-ZIRCONIA REINFORCED MULLITE AND ALUMINA CERAMICS

[75] Inventors: Paul F. Becher, Oak Ridge; Terry N. Tiegs, Lenoir City, both of Tenn.

[73] Assignee: The United States of America as represented by the United States Department of Energy, Washington, D.C.

[21] Appl. No.: 865,313

[22] Filed: May 21, 1986

[51] Int. Cl.[4] .............................................. C04B 35/56
[52] U.S. Cl. ........................................ 501/89; 501/95; 501/105; 264/65
[58] Field of Search ........................... 501/89, 95, 105; 428/698; 264/65

[56] References Cited

U.S. PATENT DOCUMENTS 4,543,345  9/1985  Wei ................................... 501/89 X

Primary Examiner—Ferris H. Lander
Attorney, Agent, or Firm—Earl L. Larcher; Stephen D. Hamel; Judson R. Hightower

[57] ABSTRACT

The flexural strength and/or fracture toughness of SiC whisker-reinforced composites utilizing mullite or alumina as the matrix material for the composite are increased by the addition of zirconia in a monoclinic or tetragonal phase to the matrix. The zirconia addition also provides for a lower hot-pressing temperature and increases the flexural strength and/or fracture toughness of the SiC whisker-reinforced composites over SiC whisker-reinforced composites of the similar matrix materials reinforced with similar concentrations of SiC whiskers.

8 Claims, No Drawings

SILICON CARBIDE WHISKER-ZIRCONIA REINFORCED MULLITE AND ALUMINA CERAMICS

This invention was made as a result of work under Contract DE-AC05-840R21400 between Martin Marietta Energy Systems, Inc., and the U.S. Department of Energy.

BACKGROUND OF THE INVENTION

The present invention relates generally to silicon carbide (SiC) whisker-reinforced ceramic composites, and more particularly to such composites and a method of preparing them wherein the ceramic material forming the matrix is mullite ($3Al_2O_3 \cdot 2SiO_2$) or alumina ($Al_2O_3$) with particulate zirconia ($ZrO_2$) added to the matrix for forming a silicon carbide (SiC) whisker-reinforced ceramic composite which provides advantages over SiC whisker-reinforced mullite and alumnia ceramic composites.

Ceramic composites reinforced with SiC whiskers have been receiving increased interest in applications requiring structured properties such as high resistance to chemicals, wear and errosion, and good structural integrity at high temperatures such as present in heat engines and the like. Reinforced ceramics are being seriously considered as candidates as structural materials for use in the fabrication of various heat engine components such as turbo-charger rotors, cylinders, bearings, valves, as well as other components of heat engines which will enable the heat engines to run more efficiently at higher temperatures than previously possible with similar components formed of metal. The reinforcing of various refractory oxides such as mullite or alumina with SiC whiskers provided a substantial increase in the fracture toughness of the ceramic so as to effectively inhibit deleterious crack formation and crack growth due to material fatigue. Such SiC whisker-reinforced ceramics are described and claimed in assignees' U.S. Pat. No. 4,543,345 which issued Sept. 24, 1985 and is entitled "Silicon Carbide Whisker Reinforced Composites and Method for Making Same". In assignees' patent, the ceramic composites exhibit increased toughness and resistance to cracking and are prepared by forming a homogenous mixture of particulate ceramic material such as alumina, mullite or boron carbide ($B_4C$) and about 5 to 60 vol. % of SiC whiskers. These whiskers have a monocrystalline structure and are of a size of about 0.6 micrometer in diameter and of a length of a range of about 10 to 80 micrometers. The SiC whisker-ceramic particulate mixture was hot pressed at a pressure in the range of about 28 to 70 MPa and at a temperature at a range of about 1600° to 1900° C. for a duration of 0.75 to 2.5 hours for providing a SiC whisker-reinforced composite with a density greater than about 99 percent of the theoretical density of the composite matrix material. Assignees' aforementioned patent is incorporated herein by reference.

The SiC whisker-reinforced ceramic composites provided by the practice of the invention described in assignees' patent briefly described above provided articles with a significant increase in fracture toughness over those provided by conventional ceramics. It has also been found that SiC whisker-reinforced ceramic composites utilizing mullite as the matrix material provide several advantages over the ceramic composites using alumina as the matrix material. For example, mullite-based composites with the SiC whiskers exhibit lower thermal conductivity (20 percent of that of similar based composites with $Al_2O_3$); lower coefficient of thermal expansion (about 55 percent of that of similar $Al_2O_3$ based composites); better thermal shock resistance; excellent creep resistance; and lower density and thus potentially lighter weight.

Recent modeling of the toughening behavior of ceramics with unstabilized or partially stabilized zirconia additions reveal that such additions to SiC whisker-reinforced ceramics should substantially improve the mechanical properties of both the mullite and the alumina-based composites. In the utilization of zirconia where a sufficient quantity of a stabilizing agent such as yttria has been added to fully stabilize the ZrO2 to a cubic phase, it has been found that the SiC whiskers undergo deleterious degradation in the composite apparently due to a reaction with the yttria stabilizer.

SUMMARY OF THE INVENTION

Accordingly, it is a primary aim or objective of the present invention to utilize a zirconia addition to the base material of an alumina or mullite matrix reinforced with SiC whiskers so as to provide the advantages attainable by zirconia additions. It has been discovered that when unstabilized or partially stabilized zirconia in the monoclinic or tetragonal phase, i.e., zirconia without the additions of yttria, calcium, magnesia or other stabilizers necessary to fully stabilize the zirconia to the cubic phase, is added to alumina-or mullite-based composites the ceramic composites possess significantly improved mechanical properties and improved sintering characteristics. In accordance with the present invention alumina- or mullite-based composites reinforced with SiC whiskers are provided with additions of $ZrO_2$ in the monoclinic or tetragonal phase for preparing SiC whisker-reinforced ceramics which possess a substantial increase in fracture toughness and/or flexural strength over the SiC whisker-reinforced alumina- or mullite-based composites as described in assignees' aforementioned patent. With alumina- or mullite-based ceramics reinforced by SiC whiskers the addition of the monoclinic or tetragonal phase zirconia provides a greater fracture toughening effect than occurs with the addition of either the SiC whiskers or the zirconia.

Generally, the method of the present invention is directed to the fabrication of a SiC whisker-reinforced ceramic composite characterized by at least one of increased fracture toughness and flexural strength. The composite comprises a matrix of $3Al_2O_3 \cdot 2SiO_2$ or $Al_2O_3$ and an adequate concentration of unstabilized or partially stabilized zirconia to increase the fracture toughness of the SiC whisker-reinforced composite over that obtainable without the zirconia addition. The percent SiC whiskers with the whiskers being of a monocrystalline structure and in a size range of about 0.6 micrometer in diameter and a length of 10 to 80 micrometers and which whiskers are characterized by causing crack deflection and crack bridging and by whisker pull-out from the matrix when the matrix is subjected to crack-forming stresses. The various composites with increased flexural strength and/or fracture toughness have a density greater than about 94 percent of theoretical density. The fabrication of the composite is achieved by hot pressing the mixture of alumina or mullite particulates, SiC whiskers, and zirconia particulates at a temperature of about 1400° to 1600° C. at a pressure in the range of about 7 to 70 MPa for a duration of 0.2 to 2.0 hours to provide the densified composite.

Other and further objects of the invention will be obvious upon an understanding of the illustrative composites and the method for the fabrication of such composites about to be described or will be indicated in the appended claims, and various advantages not referred to herein will occur to one skilled in the art upon employment of the invention in practice.

DETAILED DESCRIPTION OF THE INVENTION

As generally described above and more particularly described in assignees' aforementioned patent, SiC whisker-reinforced ceramic articles are prepared from a mixture of $Al_2O_3$ or $3Al_2O_3.2SiO_2$ particulates and about 5 to 30 vol. % SiC whiskers which have the above-described physical properties. The present invention departs from the teachings in the aforementioned patent by the addition of about 3 to 40 vol. % of unstabilized or partially stabilized zirconia particulates which, as will be pointed out below, provide a substantial increase in the flexural strength and/or fracture toughness over that of similarly based SiC-reinforced ceramics. With the unstabilized or partially stabilized zirconia added to the matrix material, the resulting mixture is ball milled and then hot pressed under vacuum or an inert atmosphere such as argon at a temperature of about 1400° to 1600° C. and a pressure in the range of about 7 to 70 MPa for the duration of about 0.2 to 2.0 hours to provide composites with a theoretical density in the range of about 94 to greater than about 99 percent of the theoretical density of the mixture of the base matrix material of alumina or mullite plus the zirconia and SiC whiskers.

The mixture of the matrix material, the zirconia additive, and the SiC whiskers can be readily provided in a conventional high-shear, ultrasonic mixture with the mixing being continued until the whiskers and the zirconia additive are homogenously dispersed among the mullite or alumina particulates. The particulate alumina or mullite is in a size range of about 0.1 to 10 micrometers, while the particulate zirconia is in a size range of about 0.01 to 2 micrometers. Upon completion of the blending step, the composite mixture of powders and whiskers is ball milled for a duration in the range of about 1 to 8 hours to lower the size distribution of the whiskers and effect the breaking-up of any particulate agglomerates for improving the packing efficiency of the mixture. The mixture is then hot pressed in vacuum or an inert atmosphere such as argon at a temperature of about 1400° to 1600° C. and a pressure in the range of about 7 to 70 MPa for the duration of about 0.2 to 2 hours.

The use of the unstabilized or partially stabilized forms of zirconia is essential in the practice of the invention in that any substitution of zirconia fully stabilized by adding a sufficient quantity of a stabilizing agent such as yttria to obtain the cubic phase would result in severe reactions involving the SiC whiskers which significantly detract from the physical properties of the composite. The zirconia in larger particle sizes is monoclinic and can be converted to the tetragonal phase by adequately reducing the particle size or by adding stabilizing agents. Another advantage gained by utilizing the zirconia additive is that the composites can be hot pressed to essentially full density, i.e., greater than about 99 percent of the theoretical density of the matrix plus the whiskers and zirconia, at a realitively low temperature in the range of about 1400° to 1600° C. as opposed to the lowest temperature of about 1600° C. used in assignees' aforementioned patent for pressing composites of SiC whisker-reinforced alumina or mullite without the $ZrO_2$ addition. It has been found that this lower hot-pressing temperature provides a relatively fine-grained structure and also significantly reduces the possibility of any deleterious reactions occuring between the SiC whiskers and the $ZrO_2$.

In order to more clearly demonstrate the advantages of the present invention, four samples of ceramic composites were prepared. One of the samples was formed of unreinforced mullite. A second sample was formed with a mullite matrix reinforced with 20 vol. % SiC whiskers. These first two samples were hot pressed under vacuum at a similar pressure and temperature as described in assignee's aforementioned patent. third sample was formed of a mullite matrix with 5 vol. % of zirconia added thereto and reinforced with 20 vol. % SiC whiskers. The fourth sample prepared was similar to the third sample except that it contained 20 vol. % zirconia. The third and fourth samples were hot pressed at a temperature of about 1500° C. under an argon atmosphere at a pressure of 55 MPa. As shown in Table 1 below, the flexural strength and fracture toughness provided by the addition of zirconia yields a significant increase over the flexural strength and/or fracture toughness of the unreinforced mullite and the mullite with 20 vol. % SiC whiskers.

TABLE 1

|  | Unreinforced Mullite | Mullite- 20 Vol. % SiC Whiskers | Mullite- 20 Vol. % Whiskers- 5 Vol. % $ZrO_2$ | Mullite- 20 Vol. % SiC Whiskers- 20 Vol. % $ZrO_2$ |
|---|---|---|---|---|
| Flexural Strength (MPa; Ksi) | 200, 30 | 420, 60 | 450, 65 | 430, 62 |
| Fracture Toughness (MPa · m½) | 2 | 4.7 | 5.6 | 6.9 |

The above samples do not represent the optimization of SiC whisker or zirconia concentrations in the composite but are primarily illustrative of the substantial increase in flexural strength and/or fracture toughness achieved over previously known SiC whisker-reinforced ceramics such as described in assignees' aforementioned patent.

The addition of zirconia to SiC whisker-reinforced alumina-based ceramics increases the flexural strength and fracture toughness of the composite. In the case of the alumina matrix the flexural strength of the composite showed an increase with as little as 3 vol. % zirconia but the fracture toughness did not show any increase until about 12 vol. % zirconia was added. As shown in Table 2 below, the alumina-based ceramic with 20 vol. % SiC whiskers is increased in fracture toughness by addition of 20 vol. % zirconia.

TABLE 2

| Al$_2$O$_3$ - Vol. % SiC Whisker | Vol. % ZrO$_2$ | Fracture Toughness (KIc) (MPa · $\frac{1}{2}$m) | Flexural Strength (MPa, Ksi) |
|---|---|---|---|
| 0 | | 3.5–4.5 | 300, 43 |
| 5 | | 8 | 330, 48 |
| 10 | | ~7 | 455, 66 |
| 20 | | 8.3 | 655, 95 |
| 30 | | 9 | 685, 100 |
| 20 | 5 | 7.5 | 670, 97 |
| 20 | 12 | 8.4 | 750, 109 |
| 20 | 20 | 10 | 560, 81 |

As illustrated by the above samples, the utilization of zirconia in the formation of the ceramic composites reinforced with SiC whiskers provides a very significant increase in fracture toughness and/or flexural strength. The zirconia concentration with the mullite matrix is preferably greater than about 3 vol. % since smaller additions do not provide an increase in flexural strength or fracture toughness of any significance over that achievable without the zirconia additions. As also pointed out above, the minimum concentration of the zirconia in the alumina matrix composite is about 3 vol. % before an increase in flexural strength occurs but is about 12 vol. % before any increase in fracture toughness is provided over that achieved with the SiC whisker-reinforced alumina matrix without the ZrO$_2$ additions. The addition of zirconia in concentrations greater than about 40 weight percent to the mullite, or alumina, matrix does not appear to provide any additional increases in flexural strength and/or fracture toughness and is expected to decrease the overall ceramic properties provided by the particular matrix material.

The present invention is believed to provide SiC whisker-reinforced composites which are uniquely suitable especially with respect to the mullite-based composites where low thermal conductivity and coefficients of thermal expansions are required such as in valve seats, turbo-charger rotors, piston caps, and cylinder liners. Also, while composites of greater than about 99 percent of theoretical density can be provided, in some applications composites of lower density in the range of about 94 to 99 percent of theoretical density can be satisfactorily employed since the present invention also provides increases in the flexural strength and/or fracture toughness of these lower density composites. Further, while the flexural strength and/or fracture toughness show an increase with the addition of about 3 vol. % zirconia, additions of zirconia as low as 1 vol. % enhance the sinterability of the composite mixtures.

We claim:

1. A SiC whisker-reinforced ceramic composite characterized by at least one of increased flexural strength and resistance to fracture, comprising a composite defined by a matrix of mullite or alumina with an adequate concentration of zirconia in a monoclinic phase or a tetragonal phase to provide an increase in at least one of flexural strength and fracture toughness of the SiC whisker-reinforced composite over SiC whisker-reinforced composites provided without the zirconia addition, and with about 5 to 30 vol. % SiC whiskers homogenously dispersed therein, said SiC whiskers having a monocrystalline structure and a size range of about 0.6 micrometer in diameter and a length of about 10 to 80 micrometers with said whiskers being characterized in the composite by causing crack deflection and crack bridging and by whisker pull-out from the matrix when the composite is subjected to crack-forming stresses.

2. The SiC whisker-reinforced ceramic composite claimed in claim 1, wherein the adequate concentration of the zirconia is in the range of about 3 to 40 vol. %.

3. The SiC whisker-reinforced composite claimed in claim 1, wherein the matrix is mullite, and wherein the adequate concentration of zirconia is in the range of about 3 to 40 vol. %.

4. The SiC whisker-reinforced composite claimed in claim 1 wherein the matrix is alumina, and wherein the adequate concentration of zirconia is in the range of about 12 to 40 vol. %.

5. A method for Preparing a SiC whisker-reinforced ceramic composite having at least one of increased flexural strength and resistance to fracture, comprising the steps of forming a homogenous mixture of a matrix consisting essentially of particulate mullite or alumina having added thereto an adequate concentration of zirconia in a monoclinic or a tetragonal phase to provide an increase in at least one of flexural strength and fracture toughness of the SiC whisker-reinforced composite over SiC whisker-reinforced composites obtainable without the zirconia addition, and about 5 to 30 vol. % SiC whiskers having a monocrystalline structure and in a size range of about 0.6 micrometer diameter and a length of about 10 to 80 micrometers, and hot pressing the mixture at a pressure in the range of about 7 to 70 MPa at a temperature of 1400° to 1600° C. for a duration of about 0.2 to 2.0 hours to provide a composite with a density greater than about 94 percent of theoretical density of the ceramic material, zirconia and SiC whiskers, said SiC whiskers being characterized by causing crack deflection and crack bridging and by whisker pull-out from the matrix upon the composite being subjected to crack-forming stresses.

6. The method for preparing a SiC whisker-reinforced composite as claimed in claim 5, wherein the adequate concentrationof zirconia is in the range of about 3 to 40 vol. %.

7. The method for preparing a SiC whisker-reinforced composite as claimed in claim 5 wherein the matrix is mullite, and wherein the adequate concentration of unstabilized or partially stabilized zirconia added thereto is about 3 to 40 vol. %.

8. The method for preparing a SiC whisker-reinforced composite as claimed in claim 5 wherein the matrix is alumina, and wherein the adequate concentration of zirconia added thereto is about 12 to 40 vol. %.

* * * * *